United States Patent [19]

Rice

[11] Patent Number: 4,943,978

[45] Date of Patent: Jul. 24, 1990

[54] DIGITAL INTERFACE UNIT

[75] Inventor: Thomas B. Rice, Laguna Beach, Calif.

[73] Assignee: Hughes Aircraft Company, Los Angeles, Calif.

[21] Appl. No.: 298,293

[22] Filed: Jan. 17, 1989

Related U.S. Application Data

[63] Continuation of Ser. No. 81,561, Jul. 31, 1987, abandoned, which is a continuation of Ser. No. 802,786, Nov. 27, 1985, abandoned.

[51] Int. Cl.⁵ ............................................. H04K 1/102
[52] U.S. Cl. ......................................... 375/1; 370/43; 370/99
[58] Field of Search ................... 370/43, 58, 60, 94.1, 370/99, 60.1, 94.2, 94.3; 375/1, 121; 178/2 B, 71 L

[56] References Cited

U.S. PATENT DOCUMENTS

| 3,975,712 | 8/1976 | Hepworth et al. | 370/24 |
|---|---|---|---|
| 4,225,919 | 9/1980 | Kyu et al. | 370/99 |
| 4,377,862 | 3/1983 | Koford et al. | 370/43 |
| 4,542,380 | 9/1985 | Beckner et al. | 370/43 |
| 4,594,708 | 6/1986 | Servel et al. | 370/99 |
| 4,638,477 | 1/1987 | Okada et al. | 370/94 |

FOREIGN PATENT DOCUMENTS

| 0101609 | 2/1984 | European Pat. Off. . |
| 2509553 | 1/1983 | France . |
| WO84/00655 | 2/1984 | PCT Int'l Appl. . |

OTHER PUBLICATIONS

Tanenbaum, *Computer Networks*, 1981, Prentice-Hall, Inc., pp. 7-13, 121-122, 169-171, 191, 237-239, 373-377, 421, 427.
Microprocessing and Microprogramming, vol. 9, 1982, May #5, "A Microprocessor Based Protocol Converter for the Direct Connection of a Mainframe to a Packet Switched Network".
International Search Report No. PCT/US 86/02317.

*Primary Examiner*—Benedict V. Safourek
*Assistant Examiner*—Christopher O. Edwards
*Attorney, Agent, or Firm*—Wanda K. Denson-Low

[57] ABSTRACT

An interface apparatus and method is disclosed which allows communication of digital data messages between a first type of data terminals (10 and 65) employing a message protocol (FIG. 1a) with a "free text-type" message, and other user devices employing other digital message protocols. The invention is adapted to exploit the free text message capability of the first protocol. In accordance with the invention, the incoming user data messages are packed into one or more free text messages of the first message protocol, and conversely "unpack" free text messages from the data terminal employing the first protocol are unpacked and formatted into the message protocol format employed by the user device 65. The invention eliminates the necessity for expensive translation devices which translate the data, and allows a plurality of user data terminals to communicate via a link comprising the data terminals employing the first message protocol.

18 Claims, 3 Drawing Sheets

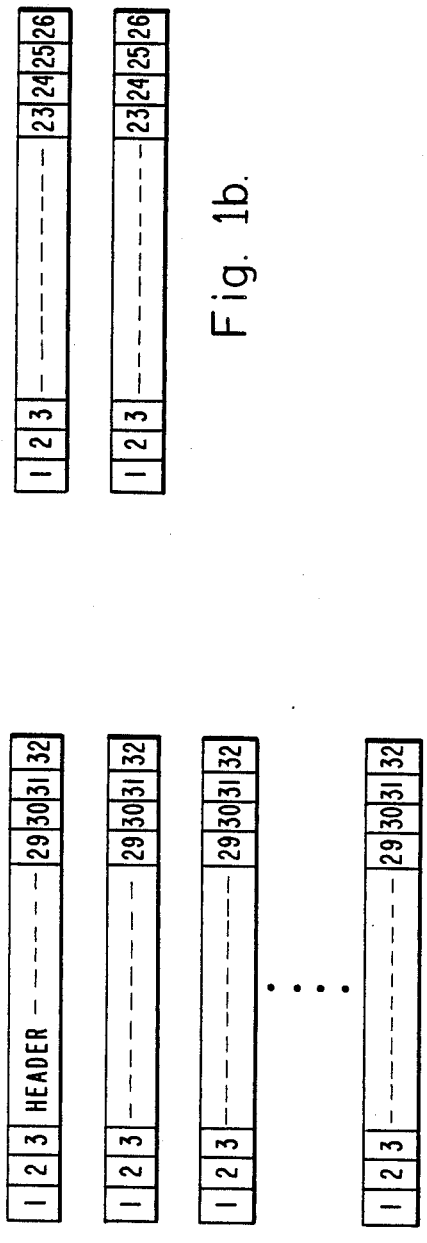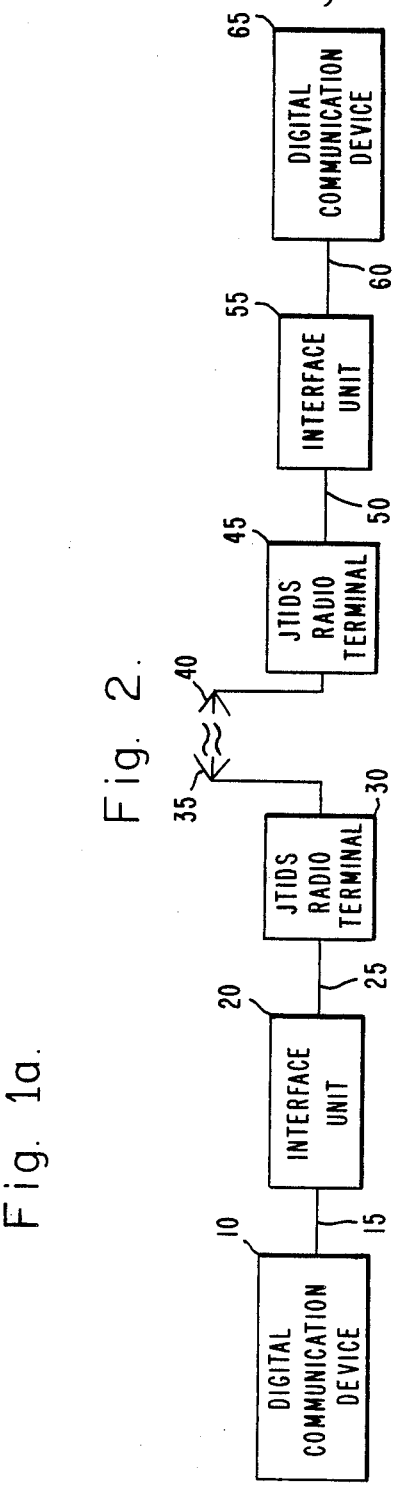

DIGITAL INTERFACE UNIT

This application is a continuation of application Ser. No. 07/081,561 filed July 31, 1987, now abandoned, which is continuation of Ser. No. 06,802,786, filed Nov. 27, 1985, now abandoned.

BACKGROUND OF THE INVENTION

The present invention relates to interface units for allowing digital communication between digital data devices employing different message protocols.

There are presently data communications devices in use today which require the data to be packed into specific message formats for reliable data transmission and reception. Examples of such devices are terminals which are employed for anti-jam secure radio transmission. There are different types of such terminals in use today, each adapted for communication of digital data in a specific message format. By way of example, the U.S. military employs a tactical radio system known as the "Joint Tactical Information Distribution System" (JTIDS) for tactical information exchange in an anti-jam secure link.

JTIDS employs a communication technique known as Time Division Multiple Access (TDMA) which permits messages to be sent from numerous terminals on a specified network in a time-sequenced basis. JTIDS is a jam resistant system using spread spectrum techniques and fast frequency hopping to distribute the transmitted data over a wide frequency bandwidth. Thus, JTIDS information is broadcast omnidirectionally at many thousands of bits per second and can be received by any JTIDS terminal within range. Information flows directly from many transmitters to many receivers; each JTIDS terminal can select or reject each message according to its need for the information.

The JTIDS may employ one particular data protocol known as Interim JTIDS Message Set "IJMS", or another protocol known as Tactical Digital Link "TADIL J", comprising an alphabet of types of data messages. For example, each IJMS message comprises a header word which defines the type of message, and eight data words containing the information. A single message might comprise information such as track report, fuel and ordinance reserves, position, and so on.

Other types of terminals also exist, with data protocols which do not coincide with those employed by JTIDS. Military examples include Army Tactical Datalink ATDL-1, TADIL A, and TADIL B. These terminals provide secure transmission capabilities, but are not adapted to provide significant jamming resistance. In many instances, it would be advantageous to allow communication between a JTIDS network and another tactical network such as TADIL B, so as to take advantage of an existing JTIDS network to provide a jamming resistance capability.

Thus, there exists a need to provide a means to allow communication between two or more types of communication terminals employing different message formats. Attempts have been made to meet this need by the provision of a translator terminal, which receives the information signal from one type of communication terminal employing one specific message format, and "translates" the intelligence from the terminal into a second type of message format compatible for utilization by the second user. The translation process is understood to involve the decoding of the information in one format, and subsequent encoding of the data into the second type of message format. Such translator devices are subject to translation losses or errors and are very expensive.

It would therefore be an advance in the art to provide an improved means for interfacing between data communications terminals employing different message protocols so as to allow communication between such terminals, without employing a data translator.

SUMMARY OF THE INVENTION

In accordance with the invention, an interface unit is provided to facilitate communication between a first digital data terminal employing a link message protocol comprising a free text message type format and a plurality of other digital data terminals (the "users") employing other message protocols. The invention exploits the free text capability of the link message protocol, wherein the data bits of that message have no predetermined significance, as is the case with fixed format messages. The interface unit is adapted to pack the incoming digital messages from the user devices into "free text" messages in the link message protocol. Thus, such digital messages from the user device may be communicated via a first interface unit to a first data terminal, and relayed over a communication link to a second data terminal employing the link message protocol for the respective user device. The second data terminal is coupled to a second interface unit which is adapted to recognize and unpack free text-type messages into the appropriate user message protocol. The second interface unit may be coupled to a plurality of user devices.

The invention further comprises the method for communicating digital data from one or more user device over a data link comprising first and second link terminals employing a link message protocol. The link protocol includes a first message type wherein the data bits in selected words do not have a predetermined significance. In accordance with the method, user digital data is packed into one or more messages of the first message type and and are provided to the first link terminal for transmission to the second link terminal. The messages received at the second link terminal are unpacked from the link protocol and formatted into the user protocol. This user protocol data is then provided to one or more user devices which employ the user protocol. Hence, the invention allows user digital data terminals to communicate via a link comprising the link data terminals employing the first message protocol.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 1(a) illustrates a first message protocol comprising a free text message, and FIG. 1(b) illustrates a second message protocol.

FIG. 2 is a block diagram of a digital data communication link employing the invention.

DETAILED DESCRIPTION OF THE PREFERRED EMBODIMENT

Figure 3:
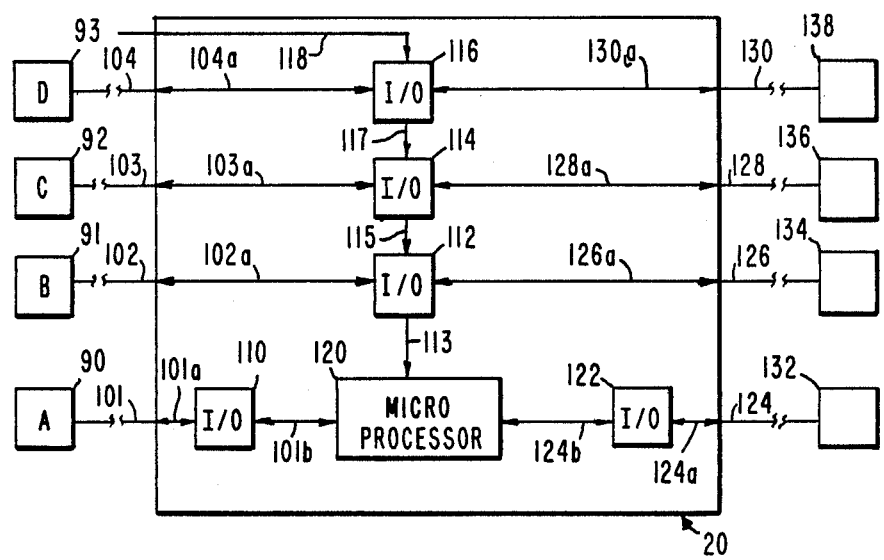
FIG. 3 is a block diagram of the presently preferred embodiment of the interface unit.

The present invention comprises a novel digital data interface apparatus and method. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications. Thus, the present invention is not intended to be limited to the embodiment shown, but is to be accorded the widest scope consistent with the principles and novel features disclosed herein.

The preferred embodiment of the invention is described in the context of interfacing with JTIDS type radio terminals. These terminals operate with a specific digital message protocol, typically either IJMS or TADIL J. Communications between JTIDS terminals are secure and highly resistant to jamming.

Other types of digital radio terminals are in use, such as the TADIL A and TADIL C terminals; these terminals are secure but not resistant to jamming. It is often desirable to have the ability to interface terminals such as the TADIL A or TADIL C terminals to a JTIDS terminal so as to take advantage of an existing jam resistant communications network when the message is being relayed. However, the difference between the message protocol employed by the respective terminals prohibits direct communications between them.

A characteristic of the IJMS and TADIL J message protocols, in addition to fixed format messages, is the provision of a "free text" message. That is, the terminal is adapted to recognize an incoming user message which is "tagged" as a free text message, and to format that message so that it is transmitted verbatim to the receiving JTIDS terminal for decoding of the free text message. In effect, the data bits of a free text message are considered as blanks, with no predetermined significance as is the case for fixed format messages. The provision of a free text message in a message protocol is very common, and is not limited to the IJMS and TADIL J protocols. Moreover, the use of the term "message protocol" as used herein means message protocols such as, for example, IJMS, TADIL etc., as distinguished from signal protocols such as, serial parallel, etc.

The universal IJMS message protocol is illustrated by way of example in FIG. 1(a), and comprises an alphabet of messages consisting of 9 digital words each 32 bits in length. The IJMS language comprises a number of different message types, each fulfilling a particular tactical requirement. Specifically the first word of each message block is the "header" word, which includes bit locations whose values define the particular message type. For example, bit positions 1 through 3 in the header word can define the type of message to follow such as, for example, track report, position, mission status, free text, etc. The standard face text message can be further defined as non-error-coded information or error coded information, bit position 4 can indicate if the message has been relayed or received directly from the sender. The next bit positions 5 through 19 can be used to identify the message source by its individual code. Bit position 20–22 specify the category of message such as a track report message, free text, etc. Bit positions position 24 through 26 specify the subcategory such as air track or sea track, etc. Bit positions 27 through 30 label the message such as by specifying which one of up to sixteen air tracks are being sent, or in the case of a free text message, that it is in TADIL-A, TADIL-B, etc. Bit position 31 can identify a special processor, and bit position 32 can identify whether the message is a training purpose message. Of course, the above is merely an exemplary format for the header word and other formats could be used.

As indicated above, one of the message types is the "free text" message. In the free text message, the last eight 32-bit-long words are data words which comprise "blank bits," i.e., the bit values are not assigned any particular intelligence function. These blank bits are available to have bits of information comprising the message to-be-transmitted packed into them.

The preferred embodiment of the invention exploits the "free text" message capability of the IJMS or TADIL J protocol in the communication of digital data, and will first be generally described in connection with the communication link block diagram of FIG. 2. The invention comprises user devices such as digital communication devices 10 and 65 each of which comprises a digital radio terminal which employs a non-IJMS message protocol, By way of example, the first such device 10 may utilize the TADIL-A protocol illustrated in FIG. 1(b), wherein each message comprises two digital words each 26 bits in length. For this example, it may be assumed that users communicate between the two devices 10 and 65 over communications links (not shown) which are secure (i.e., the data is encrypted) but not resistant to jamming. However, it is desirable to be able to employ the JTIDS terminal link to allow secure, jam-resistant communication between the two devices 10 and 65. Thus, two terminals 30 and 45 each comprise JTIDS type radio terminals which communicate via an rf link comprising two antennas 35 and 40.

As a result of the different message protocols between the user devices 10 and 65 and the JTIDS radio terminals 30 and 45, two interface units 20 and 50 are provided to respectively interface the devices 10 and 65 to the JTIDS terminals 30 and 45. Hard-wire connections 15 and 25 respectively couple the first user device 10 to the interface unit 20 and the interface unit 25 to JTIDS terminal 30. Similarly, hard-wire connections 60 and 50 respectively couple the user device 65 to the interface unit 55, and the interface unit 55 to JTIDS terminal 45.

The interface unit 20 is adapted, in accordance with the invention, to "pack" the user's message from the first user device 10 in a TADIL protocol, for example, into a "free text" message provided in the IJMS protocol. The interface unit 55 is adapted to "unpack" the IJMS free text message into the user's TADIL message format for use by the second device 65, i.e., two words, each 26 bits in length. No translation of the data, with the concomittant translation losses, is required. Thus, communication between the user devices 10 and 65 via the JTIDS link is made possible by the interface units 20 and 55.

A general block diagram of a typical interface unit 20 is shown in FIG. 3. Respective user devices 90-93 each employing predetermined message protocols A, B, C, D are coupled to interface unit 20 by data lines 101–104. The user devices may comprise a wide variety of communications devices including, for example, TADIL terminals.

The interface unit 20 comprises a plurality of input/output (I/O) devices 112, 114, and 116, which selectively couple the respective user devices 91–93 to a microprocessor 120 or to respective communication links 134, 136, 138. Thus, for example, communication link 138 may comprise a long range over-the-horizon communication link employing HF (high frequency) or VHF (very high frequency) signals. Link 136 may comprise a short range, UHF link. Link 134 may comprise a modem for connection to a land line link, such as a telephone network. An I/O device 110 couples line 101 to the microprocessor 120 via line 101b. The I/O device 122 couples the microprocessor 120 to a JTIDS link device 132 via lines 124b and 124a.

The actual configuration of the I/O devices illustrated in block form in FIG. 3 are conventional types and will depend on the particular user device. For example, a user device may be configured to comply with MIL-STD 1553B, NTDS or the RS232 specifications, which define the user device interface, such as the number of wires and the electrical characteristics of the signal (polarity, voltage level and the like).

The I/O devices are controlled via a control bus 118 to determine the status of the data paths through the I/O devices. Thus, the respective I/O devices 112, 114 and 116 may be controlled so as to couple user line 104 to either line 130 for coupling to the VHF link 138 or to line 117 for coupling to the microprocessor 120 for eventual coupling to the JTIDS communication device 132 to provide the capability of allowing each use device to communicate with the JTIDS communications link 132 through the microprocessor 120, or through other data links not involving the JTIDS terminal. Control buses are well known in the art thus, specific details are not described here.

It is to be understood that the structure of the interface unit 20 disclosed in FIG. 3 is merely exemplary, and is intended to illustrate the versatility of interface units which may employ the invention.

The microprocessor 120 may comprise any of a number of commercially available circuits, such as the Motorola 6800 microprocessor. Computer programs and data adapted to interface each of the respective user devices to the JTIDS terminal is stored in memory devices such as PROMs (programmable read-only-memories) for access by the microprocessor 120. The microprocessor 120 is programmed to carry out the functions illustrated in the firmware flow chart of FIGS. 4a and 4b. Typical compilers that can be used to generate the computer programs include Pascal, Basic, C-Language and Fortran.

Figure 4A:
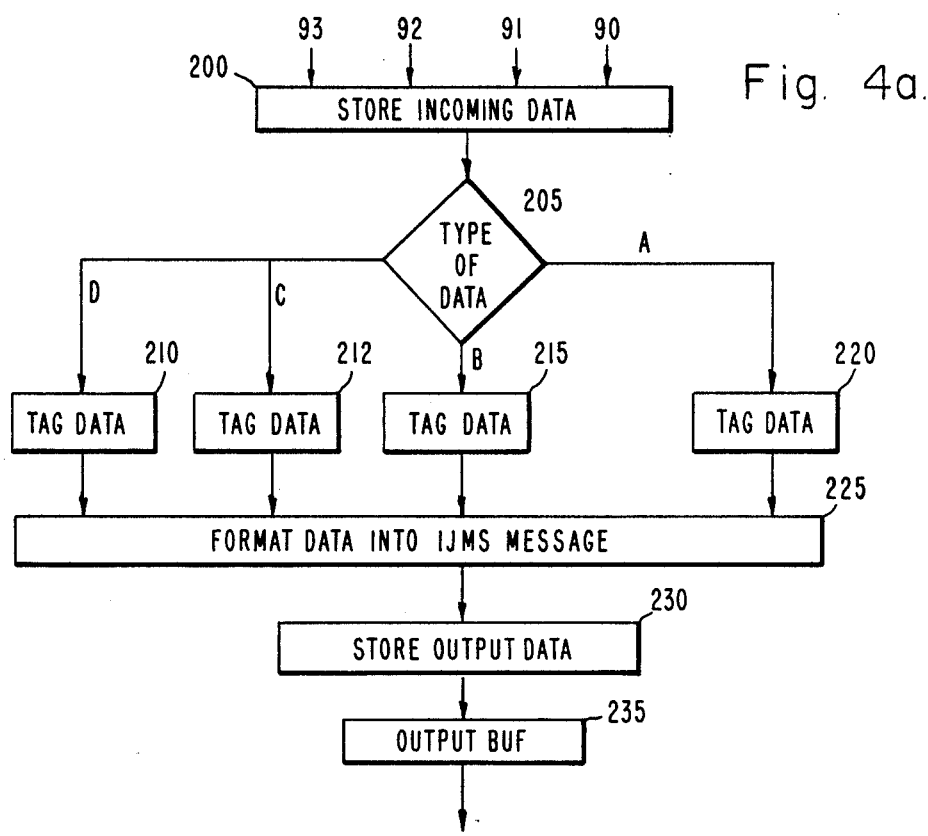
FIGS. 4(a) and 4(b) are firmware flow charts of the operation of an interface unit employing the invention.
Figure 4B:
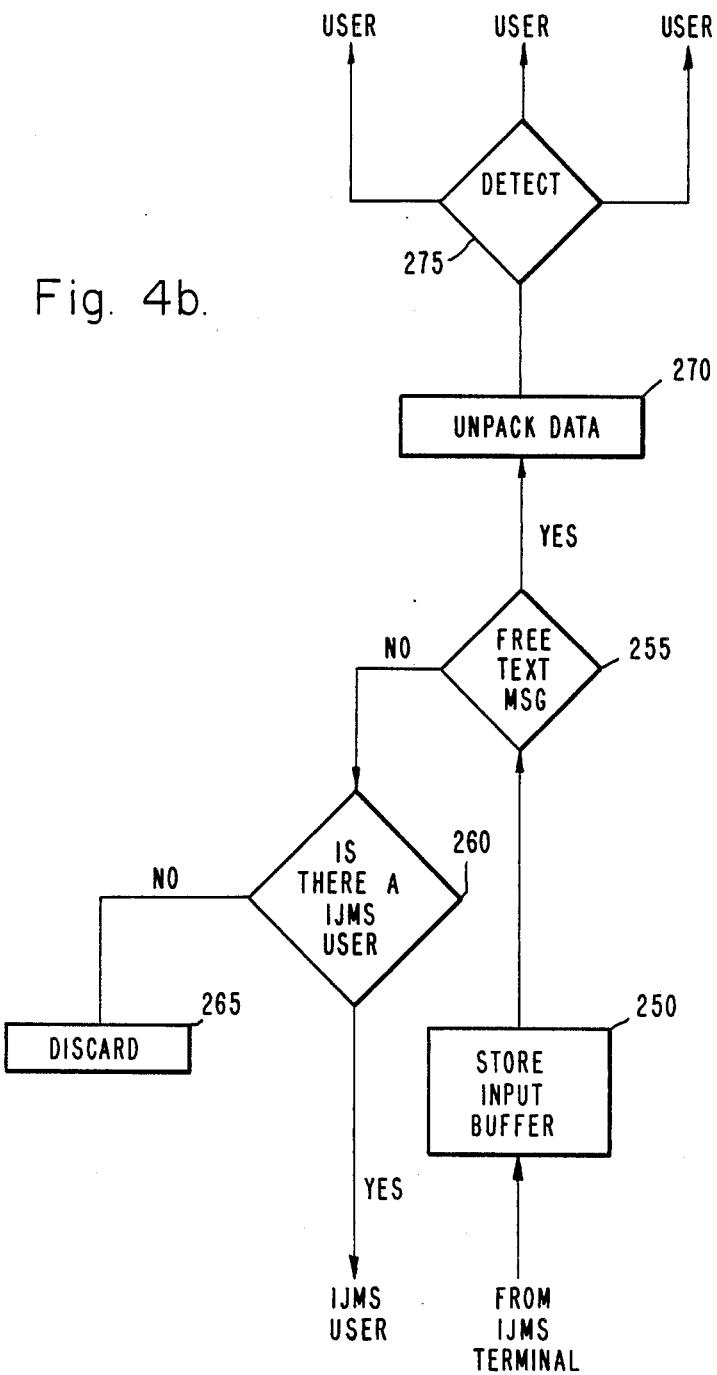

The flow diagram of FIG. 4a illustrates the sequence of steps for formatting the user data into IJMS or TADIL J free text messages. The incoming data from the user devices 90–93 is stored at step 200 in a buffer memory within the microprocessor 120. Whether data from one or more of user devices 90–93 is coupled to the microprocessor 120 will depend on the status of the signal on control bus 118, as described above with reference to FIG. 3.

At step 205 each respective data protocol type is identified. The data may comprise several possible protocols A, B, C, or D depending upon the status of the signal on control line 118.

The data type may be identified by correlation of the data with the status of the control line 118. Alternatively, the data protocol of the user device(s) may be predetermined, e.g., where all user devices employ the same message protocol. The data type is "tagged" at step 210, 212, 215 and 220. As was explained in more detail with reference to FIG. 1a, in the preferred embodiment, a unique digital code is employed to identify each of the respective user message protocols. Each incoming user message is therefore associated or tagged with a predetermined digital identifier.

The identifier may be employed to access the appropriate PROM locations necessary to carry out the next step 225, wherein the "tagged" data is formatted into IJMS free text messages. During this step, IJMS or TADIL J format messages are generated, comprising nine 32-bit words as described with reference to FIG. 1a. The IJMS message identifier is specified in the heater word as a free text message at bit positions 27 through 30. Additional bits in the header word are reserved for the digital identifier of the user message protocol type. Other bit locations in the header word are employed to identify the specific user terminal to which the message is directed and/or from which the message originated. Thus, the microprocessor is programmed to generate an IJMS free text message, with the header word comprising the free text message identifier and the additional information defining the user message protocol and specific user device. The user message is then copied verbatim into the blank 32 bit data words comprising each IJMS message. Thus, for the user message protocol illustrated in FIG. 1(b), two 26-bit words of each user message are copied verbatim into two of the eight 32-bit data words comprising the IJMS or TADIL J message. Of course, whether the user message is densely packed into the available data bit locations of the IJMS message or spread out over all of the available words is a matter of choice.

For example, if a plurality of user messages are input to the interface unit 20 from the same user device, the microprocessor 120 may be programmed to fill each of the available data bit locations of the free text message words with the user message data. Thus, the 52 bits of the user message may be formatted into the 32 bits of the first data word, and the remaining 20 bits formatted into the first 20 bit locations of the second data word. An end-of-message identifier may be placed at the end of the message. Alternatively, the microprocessor 120 may be configured to pack one user message per IJMS or TADIL J message, and the end of each message denoted by an "end-of-message" identifier. Such alternatives may be readily implemented by programming and need not be described in further detail.

The formatted IJMS or TADIL J data is then stored at step 230 and then outputted through an output buffer at step 235 to the JTIDS terminal as one or more IJMS messages.

The microprocessor 120 when used in the receiver portion of the system is also adapted to "unpack" data moving in the opposite direction, i.e., from the JTIDS terminal to the user terminal 65 (FIG. 1). The process for unpacking the data is illustrated by the flow chart of FIG. 4b. The incoming data from the JTIDS terminal is coupled into an input storage buffer of the interface unit 55 (FIG. 2) at step 250. At step 255 a decision is made to determine whether the message is a "free text" message; this is accomplished by comparing the message identifier bits in the header word with the predetermined free text code stored in the microprocessor memory. If the message is not a free text message, then at step 260 the processor determines whether an IJMS or TADIL J user is coupled to the interface unit and, if so, passes the message to the IJMS or TADIL J user. If there is no IJMS or TADIL J user, then at step 265 the message can be discarded.

In the event that the decision at step 255 is positive, i.e., that the message is a "free text" message, then at step 270 the free text message is "unpacked." This is achieved by detecting the type of message from the message protocol type information set forth in the message header and subsequently processing the message to convert the message from the IJMS or TADIL J protocol to the appropriate user protocol such as TADIL-A, for example. Thus, for the example discussed above, the first 26 bits in the first data word of the IJMS or TADIL J message are employed for the first word of the user message and the last 6 bits of the first data word and first 20 bits of the second data word used for the second word of the user message.

At step 275 the particular user 65 (FIG. 2) to whom the message is directed is detected, again from the user identification bits in the message header word, and directed to that user.

There has been described an apparatus and method for interfacing one digital data terminal employing a message protocol comprising a free text message to another digital terminal employing a different message protocol. The invention allows digital data communication between such terminals without the need for data translation.

It is understood that the above-described embodiment is merely illustrative of the many possible specific embodiments which can represent principles of the present invention. Numerous and varied other arrangements can readily be devised in accordance with these principles by those skilled in the art without departing from the spirit and scope of the invention.

What is claimed is:

1. Digital communication apparatus for use with a communications link, said communications link having a message protocol which includes a free text message protocol, said digital communications apparatus allowing transfer of data, over said communications link, between digital communications terminals of a predetermined type having a fixed format message protocol which is incompatible with the message protocol of said communications link, which comprises:

first means, adapted to receive a fixed format digital message having a fixed format message protocol from one of said digital communications terminals of said predetermined type, for packing said fixed format digital message into a free text digital message having a free text message protocol compatible with the free text message protocol of said communications link; and second means, adapted to receive a free text digital message having a fixed format digital message contained therein from said communications link, for unpacking said fixed format digital message from said free text digital message, said second means being adapted to transmit said fixed format message to one of said digital communications terminals of said predetermined type.

2. The digital communication apparatus of claim 1 wherein said first means comprises:

means for storing said fixed format digital message received from one of said digital communications terminals;

means for identifying the message protocol type of said fixed format digital message;

means for tagging said fixed format digital message with digital identifiers indicating the fixed format message protocol type, that this message is to be transmitted as a free text message, and the terminal type to which said fixed format message is to be transmitted;

means for formatting said tagged fixed format digital message into said predetermined free text message format compatible with said communications link; and means for storing said formatted free text message.

3. The digital communication apparatus of claim 2 wherein said means for formatting comprises:

means for creating a free text header word which includes said digital identifiers; and means for copying said fixed format message into unoccupied digital words comprising said free text message.

4. The digital communication apparatus of claim 2 wherein said second means comprises:

means for storing a free text message received from said communications link;

means for detecting the receipt of said free text message from said communications link;

means for uniformatting said free text message to extract said fixed format message and identifiers therefrom;

means for reforming said fixed format message into the message protocol associated with the communications terminal identified in the transmitted message; and means for transmitting said reformatted fixed format message to the identified digital communications terminal type.

5. The digital communication apparatus of claim 1 wherein said first and second means comprise:

storage buffer means for receiving and storing fixed format messages and free text messages; and microprocessor means coupled to said storage buffer means for processing fixed format and free text messages stored therein, for identifying the message type of each fixed format digital message stored in said storage buffer means, for tagging each fixed format digital message with digital identifiers indicating the fixed format message protocol type, that this message is to be transmitted as a free text message, and the terminal type to which said fixed format message is to be transmitted, for formatting each tagged fixed format digital message into a predetermined free text message format compatible with said communications link, and for detecting the receipt of free text messages, for unformatting each free text message to extract the fixed format message therefrom by determining the fixed format message type, determining the terminal to which the fixed format message is to be sent, and unpacking the fixed format message from each free text message, and for storing each fixed format message in said storage buffer means prior to transmittal to the identified communication terminal.

6. Digital communication apparatus for use with secure, jam-resistant digital communication equipment, said digital communication equipment having a message protocol which includes a free text message protocol, said digital communication apparatus allowing transfer of data, over said digital communication equipment, between digital communications terminals of a predetermined type having a fixed format message protocol which is incompatible with the message protocol of said digital communication equipment, said digital communication apparatus comprising:
  first means, adapted to receive fixed format digital messages having a fixed format message protocol compatible with said communications terminals, for packing said fixed format digital message into free text digital messages having a free text message protocol compatible with the free text message protocol of said jam-resistant digital communication equipment; and
  second means adapted to receive free text digital messages compatible with said communication terminal and having a fixed format digital message contained therein, for unpacking said fixed format digital message from said free text digital message to provide said fixed format digital messages for use with said communication terminals.

7. The digital communication apparatus of claim 6 wherein said first means comprises:
  means for storing said fixed format digital message received from said digital communications terminal;
  means for identifying the message protocol type of said fixed format digital message;
  means for tagging said fixed format digital message with digital identifiers indicating the fixed format message protocol type, that this message is to be transmitted as a free text message, and the terminal type to which said fixed format message is to be transmitted;
  means for formatting said tagged fixed format digital message into said predetermined free text message format compatible with said communications link; and
  means for storing said formatted free text message.

8. The digital communication apparatus of claim 7 wherein said means for formatting comprises:
  means for creating a free text header word which includes said digital identifiers; and
  means for copying said fixed format message into unoccupied digital words comprising said free text message.

9. The digital communication apparatus of claim 7 wherein said second means comprises:
  means for storing a free text message received from said communications link;
  means for detecting the receipt of said free text message from said communications link;
  means for unformatting said free text message to extract said fixed format message and identifiers therefrom;
  means for reformatting said fixed format message into the message protocol associated with the communications terminals identified in the transmitted message; and
  means for transmitting said reformatted fixed format message to the identified digital communications terminal type.

10. A method of producing digital message compatible with a communications link derived from a digital communications terminal employing a message protocol incompatible with said communications link, said method comprising the steps of:
  storing said fixed format digital message received from said digital communications terminal;
  identifying the message protocol type of said fixed format digital message;
  tagging said fixed format digital message with digital identifiers indicating the fixed format message protocol type, that this message is to be transmitted as a free text message, and the terminal type to which said fixed format message is to be transmitted;
  formatting said tagged fixed format digital message into a predetermined free text message format compatible with said communications link; and
  storing said formatted free text message.

11. The method of claim 10 wherein said step of formatting said free text message comprises the steps of:
  creating a free text header word which includes said digital identifiers; and
  copying said fixed format message into unoccupied digital word comprising said free text message.

12. A method of communicating between digital communications terminals employing a fixed message format and protocol using a communications link employing an incompatible message format and protocol, said method comprising the steps of:
  storing a digital message having a predetermined fixed format derived from said digital communications terminal;
  identifying the message type of said stored fixed format digital message;
  tagging said fixed format digital message with digital identifiers indicating the fixed format message protocol type, that this message is to be transmitted as a free text message, and the terminal type to which said fixed format message is to be transmitted;
  formatting said tagged fixed format digital message into a predetermined free text message format compatible with said communications link;
  storing said formatted free text message;
  transmitting said formatted free text message over said communications link;
  storing a free text message received from said communications link;
  detecting the receipt of said free text message from said communications link;
  unformatting said free text message to extract said fixed format message and identifiers therefrom;
  reformatting said fixed format message into the message protocol associated with the communications terminal identified in the transmitted free text message; and
  transmitting said reformatted fixed format message to the identified digital communications terminal type.

13. The method of claim 12 wherein:
  said step of formatting said free text message comprises the steps of creating a free text header word which includes said digital identifiers, and copying said fixed format message into unoccupied digital words comprising said free text message; and
  said step of unformatting said free text message comprises the steps of determining the type of fixed format message contained in said free text message, and removing said fixed format message from the words of said free text message.

14. A method of communicating between digital communications terminals employing a fixed message format and protocol using a communications link employing an incompatible message format and protocol, said method comprising the steps of:

storing a digital message having a predetermined fixed format derived from said digital communications terminal;

identifying the message type of said stored fixed format digital message;

tagging said fixed format digital message with digital identifiers indicating the fixed format message protocol type, that this message is to be transmitted as a free text message, and the terminal type to which said fixed format message is to be transmitted;

formatting said tagged fixed format digital message into a predetermined free text message format compatible with said communications link;

storing said formatted free text message;

transmitting said formatted free text message over said communications link;

storing a free text message received from said communications link;

detecting the receipt of said free text message from said communications link;

unformatting said free text message to extract said fixed format message and identifiers therefrom;

unformatting said free text message to extract said fixed format message thereform, which includes determining the fixed format message type, determining the terminal to which the fixed format message is to be sent, and removing the fixed format message from said free text message; and transmitting said reformatted fixed format message to the identified digital communications terminal type.

15. The digital communications apparatus of claim 2 further comprising means for coupling a stored formatted free text message from said means for storing said formatted free text message to said communications link.

16. The digital communications apparatus of claim 15 wherein said means for formatting comprises:

means for creating a free text header word which includes said digital identifiers; and means for copying said fixed format message into unoccupied digital words comprising said free text message.

17. The digital communications apparatus of claim 7 further comprising means for coupling a stored formatted free text message from said means for storing said formatted free text message to said communications link.

18. The digital communications apparatus of claim 17 wherein said means for formatting comprises:

means for creating a free text header word which includes said digital identifiers; and means for copying said fixed format message into unoccupied digital words comprising said free text message.

* * * * *